(12) United States Patent
Cooper (10) Patent No.: US 7,685,968 B2
(45) Date of Patent: Mar. 30, 2010

(54) LIVESTOCK FEED SCRAPER

(76) Inventor: James E. Cooper, 107 Mill Rd., Manitowoc, WI (US) 54220

( * ) Notice: Subject to any disclaimer, the term of this patent is extended or adjusted under 35 U.S.C. 154(b) by 1094 days.

(21) Appl. No.: 11/341,207

(22) Filed: Jan. 27, 2006

(65) Prior Publication Data

US 2006/0170385 A1 Aug. 3, 2006

Related U.S. Application Data

(60) Provisional application No. 60/647,881, filed on Jan. 28, 2005.

(51) Int. Cl.
*A01K 1/10* (2006.01)
(52) U.S. Cl. ..................... 119/58; 119/515; 119/521
(58) Field of Classification Search ............ 119/58, 119/442, 447, 451, 515, 521; 56/344
See application file for complete search history.

(56) References Cited

U.S. PATENT DOCUMENTS

| | | | |
|---|---|---|---|
| 2,639,803 A | 5/1953 | Tonagel et al. | |
| 2,815,001 A | 12/1957 | Hanson | |
| 2,858,800 A | 11/1958 | Babson | |
| 3,343,521 A | 9/1967 | Moores | |
| 3,458,029 A | 7/1969 | Allen et al. | |
| 3,577,956 A | 5/1971 | Forster | |
| 4,243,137 A | 1/1981 | Laurenz | |
| 4,280,447 A | 7/1981 | Laurenz | |
| 4,354,593 A | 10/1982 | Diedrich | |
| 4,419,963 A | 12/1983 | Willibrordus | |
| 4,711,403 A * | 12/1987 | Gregory et al. | .......... 241/101.2 |
| 4,962,637 A * | 10/1990 | Giardina et al. | ............... 56/344 |
| 5,054,430 A | 10/1991 | Weelink | |
| 5,303,673 A | 4/1994 | Weelink | |
| 5,433,172 A | 7/1995 | Weelink | |
| 5,467,737 A | 11/1995 | Weelink | |
| 5,857,426 A | 1/1999 | Weelink | |
| 6,039,002 A | 3/2000 | Strankman | |
| 6,446,298 B1 * | 9/2002 | Berg et al. | ................... 15/93.1 |
| 6,601,536 B2 * | 8/2003 | Sprik | .......................... 119/60 |
| 7,047,905 B1 * | 5/2006 | Brade | ........................ 119/442 |

FOREIGN PATENT DOCUMENTS

| | | |
|---|---|---|
| EP | 0397257 | 10/1994 |
| EP | 0547719 | 8/1995 |
| EP | 0619068 | 1/1997 |
| EP | 0627160 | 12/1997 |
| WO | WO 96/19106 | 6/1996 |
| WO | WO 97/33465 | 9/1997 |
| WO | WO 99/18776 | 4/1999 |

* cited by examiner

*Primary Examiner*—Yvonne R. Abbott
(74) *Attorney, Agent, or Firm*—Ryan Kromholz & Manion, S.C.

(57) ABSTRACT

A device for placing food on a floor within reach of one or more animals that are feeding along a feeding rail. The device is mounted on or near the feeding rail and has an extendable and retractable arm connected to a plow. The arm is storable above the floor and does not have moving parts located on the floor. The device may move along the length of the feed rail, as well.

7 Claims, 12 Drawing Sheets

LIVESTOCK FEED SCRAPER

RELATED APPLICATION

This application claims the benefit of U.S. Provisional Patent Application Ser. No. 60/647,881, filed 28 Jan. 2005, and entitled "Livestock Feed Scraper."

BACKGROUND OF THE INVENTION

The present invention relates to devices for scraping and delivering feed to livestock and, more specifically, to devices that allow delivery of feed to livestock in a controllable manner.

When feeding livestock, such as dairy cattle, it is desirous to feed the animals in a controlled manner. That is, the animals are fed daily at the same time and also given the same amount of feed for each specific feeding time. Controlling the amount of feed of the livestock results in a better and more consistent yield and production from the livestock. For instance, dairy farmers are able to receive a higher and more consistent yield from their cows by regulating the amount of feed the cows receive.

In today's larger farms, this is usually accomplished by feeding the animals through a feeding fence. The feeding fence separates the animals from the feed or fodder, whereby only the animals' heads and necks pass through openings in the fence to access the feed. The openings in the fence are designed not to allow an animal's entire body to pass through the openings. Consequently, as the animal eats from the feed pile, eventually the animal may not reach all of the feed for the feeding session.

Devices have been designed so that more feed will be accessible for the animals. Such devices include displaceable or moving feeding fences that allow the animals to access feed initially out of reach of the animals. For instance, U.S. Pat. Nos. 5,054,430 and 5,433,172, and WO 97/33465 describe feeding fences that will move towards the feeding pile so that the livestock can access the feed pile. However, such structures require further cleaning of the feed storage area where the animals may walk on the feed storage area, especially as the fence moves. This could also be a health problem, since the livestock can track in manure and other contaminants onto the area where the feed is being stored.

Other devices, such as scrapers, have been utilized to move the feed closer to the feeding animals. The devices generally work by sliding along the floor with a chain-drive system or the like. For example, U.S. Pat. No. 2,815,001 discloses a feed bunker that pushes the feed within the feed area towards a feed rail. However, these devices interfere with cleaning of the floor of the storage area, and the moving parts of such devices may also become easily clogged and inoperative due to the interaction with the feed or fodder, and such moving parts can lead to potential injury.

Prior art devices generally require either a moving wall or plow within the feed area to move toward the feed rail, or the feed rail to move towards the feed pile, which are relatively the same process. However, both of these styles of devices still leave room for improvement for accessing feed without contaminating the feed area or hindering the cleaning process for the feed area. A device that efficiently moves feed towards animals during feeding, without contaminating the feed storage area and that will further be in minimum contact with the floor of the storage area, is desired.

SUMMARY OF THE INVENTION

The present invention provides a device and a system for automatically pushing and delivering feed from a feed pile to livestock feeding at a feeding fence or rail. The system uses several individual devices each having an extendable arm connected to a plow that can move a predetermined amount of feed toward the livestock. Alternatively, the system may utilize one individual arm that can move horizontally up and down the feeding fence.

The arm has several connected sections that provide the arm with several degrees of freedom. A piston-style actuator, preferably driven by electric means, moves the arm inwardly and outwardly from the feed pile towards the feeding fence. A pulley system will allow the devices to move up and down towards the floor of the storage area. Such movement allows the device to move completely out of the way when the floor of the storage area is swept or cleaned.

The system may be programmable for specific movements at specific times and for specific durations. The system could be run manually, as well.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention.

Figure 1:
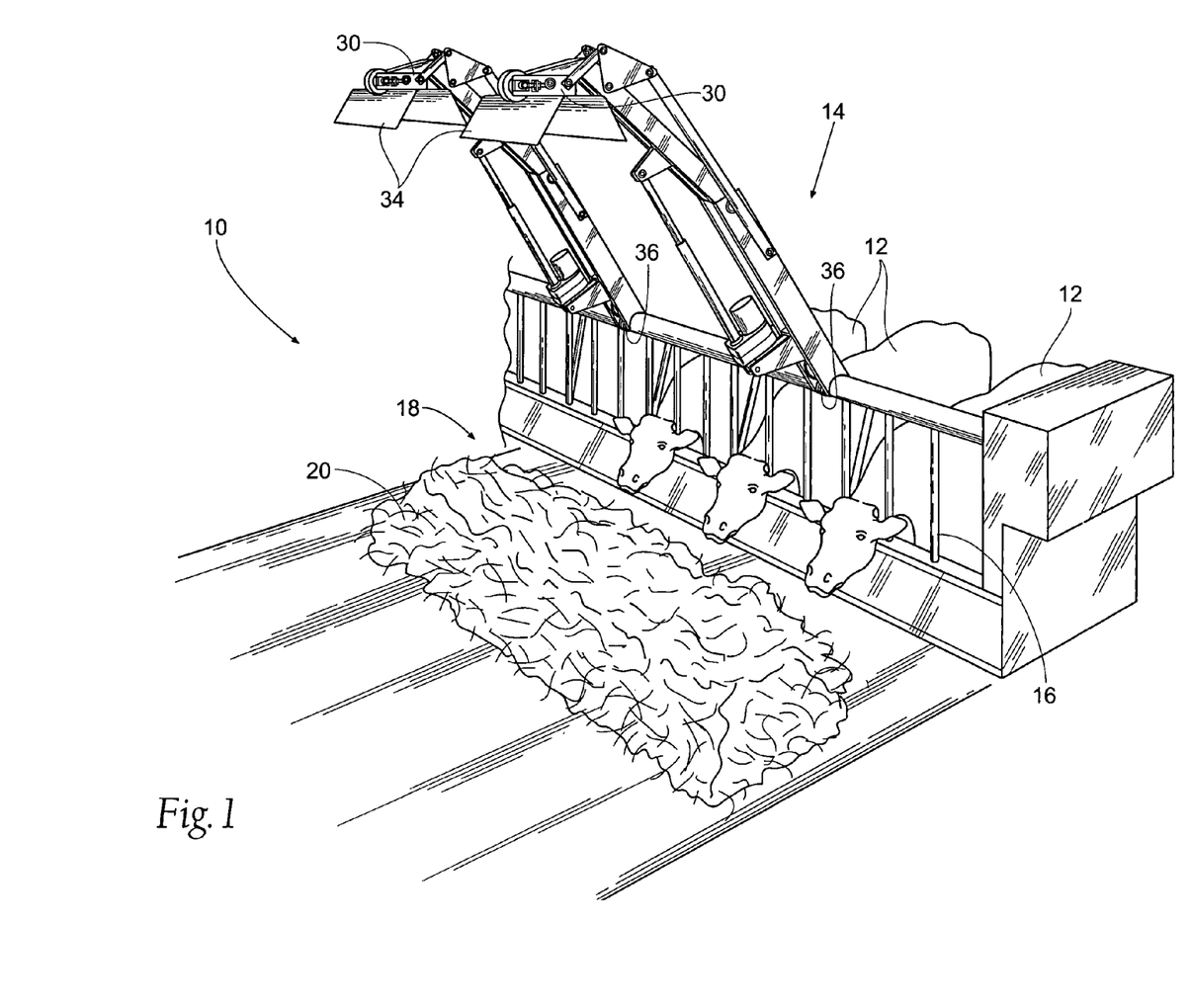
FIG. 1 shows a perspective view of a livestock feeding area including a livestock feed scraper according to the present invention.

FIG. 1 shows a feeding area 10 for feeding livestock 12. A feeding rail 16 separates the feeding area 10 into a feed storage area 18, which contains a feed pile 20, and a livestock area 14. The feeding rail 16 prevents the livestock 12 from entering the storage area 18 by allowing only the torso of the livestock 12 to pass the rail into the storage area 18. This minimizes contamination of the storage area 18 from dirt or other matter the livestock 12 may track into the livestock area 14. The rail 16 also prevents the livestock from walking on the feed pile 20. While the feed rail 16 is effective for minimizing interaction of the livestock 12 and the storage area 18, it is not always possible for the livestock 12 to reach the feed pile 20 after they have been eating for a period of time, as is exemplified by FIG. 1. A plurality of feed scrapers 30 is shown to help with this problem. As will be discussed in further detail, the scrapers 30 may be spaced apart in any desired configuration and the arrangement in FIG. 1 is merely exemplary.

Figure 2:
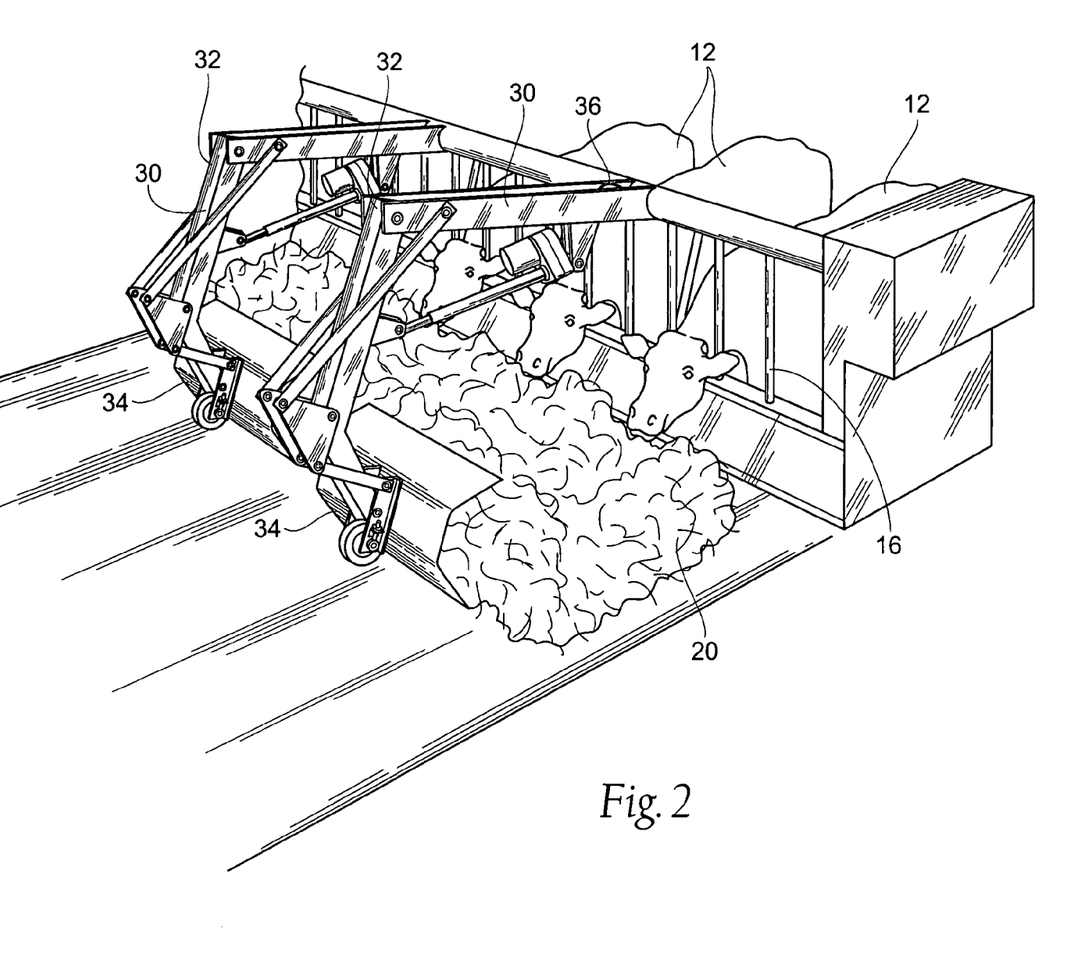
FIG. 2 shows a perspective view of the feed scraper of FIG. 1 interacting with a feed supply.

As shown in FIG. 2, the feed scrapers 30 bring the feed pile 20 closer to the livestock 12. Several feed scrapers 30 will define a feeding system, which can be designed for specific building dimensions. It is understood that the described features of a single feed scraper 30 will be applicable to all of the feed scrapers within the feeding system. The feed scraper 30 comprises an extendable arm 32 and a plow 34. A pulley system 36 provides means for upward and downward movement of the arm 32. The pulley system 36 will be shown in greater detail in FIGS. 4 and 9. The feed scraper 30 makes it easier to regulate and control the amount of feed given to the livestock 12. The arm 32 has several degrees of freedom, and can be stored or moved in several desired positions. The movement of the arm 32 will be discussed in more detail further in the application. The plow 34 may also be of any size and width and also will be discussed in more detail further in the application.

FIGS. 1 and 2 show the scrapers 30 mounted on the feed rail 16. However, the scrapers 30 may be mounted on a wall or structure above the feed rail (not shown), or possibly mounted from the floor along the feed rail. Provided that the scrapers 30 will be able to bring the feed pile 20 closer to the livestock 12 and that the scrapers 30 are movable and storable without any devices needed on the general floor area of the storage area 18, any mounting arrangement is sufficient for the invention.

Figures 3, 4:
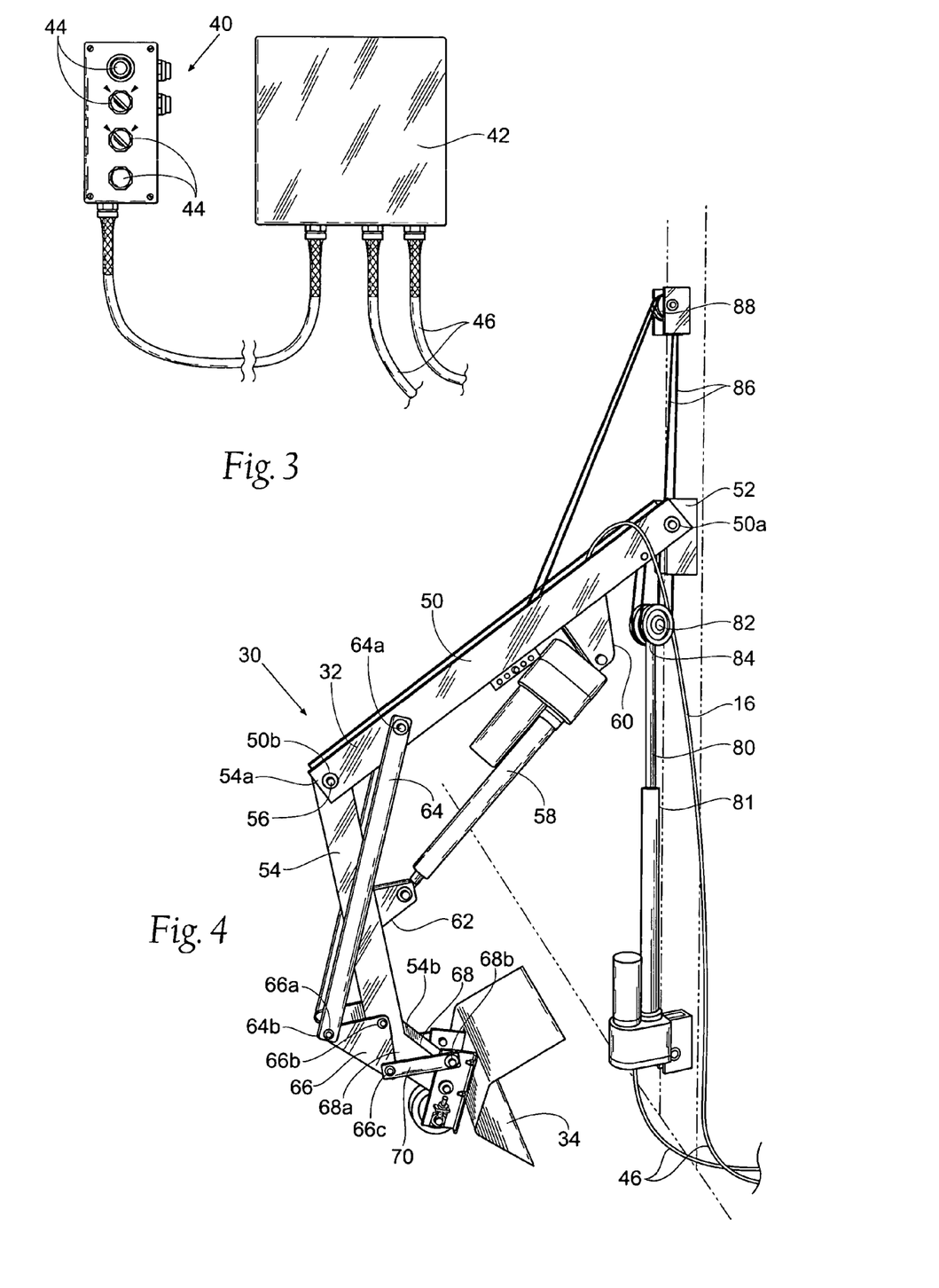
FIG. 3 is a close-up partially cut-away view of a control box according to the present invention.
FIG. 4 is a perspective view of a scraper according to the present invention in contact with the floor of a feeding area.

FIG. 3 shows a control box 40, preferably located on a wall of the barn or building. The control box 40 is connected to a circuit box 42 that allows the scraper 30 to be programmed and arranged for specific dimensions of individual barns or buildings and further programmed for specific feeding schedules. The control box 40 further contains a plurality of control buttons 44. The control buttons 44 may be used for such settings as start/stop, automatic/manual control, time settings, or other controls that may be needed during operation of the scraper 30. The control box 40 may also allow for the scrapers 30 to be controlled individually or together as a group. Power supply lines 46 lead to the scrapers 30 and the feeding system. The control box 40 and/or the circuit box 42 will be connected to a power source, preferably a standard electric power source, such as a 220V source.

FIG. 4 shows a perspective view of the scraper 30. As previously stated, the scraper 30 comprises two main sections: the extendable arm 32 and the plow 34. The extendable arm 32 is made up several sections, with each section preferably comprised of two equal length, spaced apart, parallel bars or beams. When referring to specific sections of the arm 32, unless indicated, the section will refer to both beams that comprise that section. The arrangement of the individual sections gives the scraper 30 stability without requiring excessive material. The parallel arrangement also allows the individual arm sections to be attached in an overlapping fashion, which further contributes to the ability of the arm 32 to move in a smooth fashion.

Still referring to FIG. 4, the extendable arm 32 has a first section 50 having a first end 50a and a second end 50b. The first end 50a is pivotally connected to a bracket 52. The bracket 52 allows the scraper 30 to be mounted to the feeding rail 16 or other wall structure. As previously stated, the scraper 30 may be mounted in numerous places and arrangements. The second end 50b of the first arm section 50 is connected to a first end 54a of a second arm section 54 by a pin or bolt 56 or other device that allows the second section 54 to pivot with respect to the first section 50. The second section 54 has the first end 54a and a second end 54b. A bolt 56 acts as a joint for the arm section 50 and 54. An actuator 58 moves the second section 54 with respect to the first section 50. The actuator 58 may be of any typical type, such as electric, pneumatic, or hydraulic, but is preferably an electric actuator, which is less likely to become dirty or fouled from working within the feeding environment than other types of actuators. The actuator 58 is shown mounted onto the first section 50 with a first brace 60 and onto the second section 54 with a second brace 62, but any sufficient mounting means that do not interfere with the movement of the arm sections 50, 54 will fall within the scope of the invention.

Referring further to FIG. 4, a third arm section 64 having a first end 64a and a second end 64b is pivotally mounted onto the first section 50. The arm section 64 is preferably mounted relatively nearer to the second end 50b than to the first end 50a. A fourth arm section 66 is preferably triangular in shape, having points 66a, 66b, and 66c. The point 66a is pivotally connected to the second end 54b of the second section 54, and the point 66b is pivotally connected to the second end 64b of the third section 64. Thus, the second section 54 and the third section 64 are preferably arranged as an "X", which provides support for the arm 32 and, also, allows for smoother overall movement of the arm 32.

FIG. 4 also shows a fifth arm section 68 having a first end 68a and a second end 68b. The first end 68a is attached to the second end 64b of the third arm section 64, preferably slightly angled inwardly from the third arm section 64. The sections 68 and 64 are preferably welded together. The second end 68b of the fifth section 68 connects the extendable arm 32 to the plow 34. If the extendable arm 32 is designed so that the sections 64 and 68 are integral or designed as a unitary piece, it should be understood that the section 68 is the area where the arm 32 is connected to the plow 34. The point 66c of the fourth section 66 is also connected to the fifth section 68 by a strut 70, which will provide added support for the arm 32.

Figure 5:
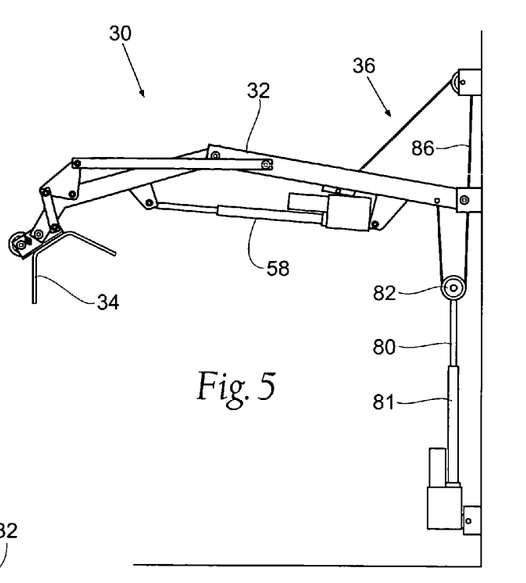
FIG. 5 is a side view of the scraper in FIG. 4 in an elevated position.

FIG. 5 shows a side view of the scraper 30 as presented in FIG. 4 in an elevated position. The pulley system 36 moves the first arm section 50 upwardly and out of the way of the feed pile (not shown). The actuator 58 further allows the second arm section 54 to be extended outwardly. This is beneficial in that the range of the arm 32 may extend further into the feed pile, which reduces the potential effort and time needed to push the feed pile forward. For instance, this eliminates the need to use a moving floor or movable fence during a feeding period, since the scraper 30 will be able to sufficiently deliver the required feed for an individual feeding session.

Figure 6:
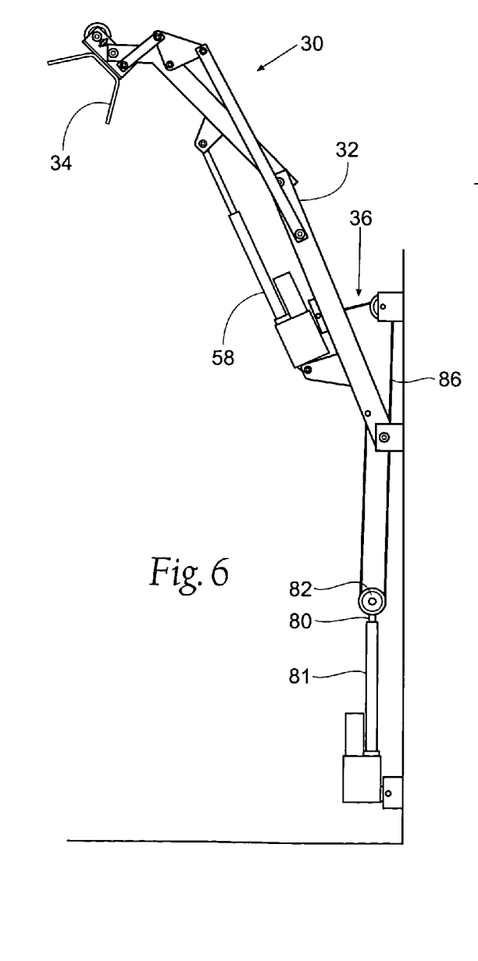
FIG. 6 is a side view of the scraper in FIG. 4 in a further elevated position.

FIG. 6 shows a further side view of the scraper 30 in a near vertical position. The pulley system 36 further allows the arm 32 to move into the shown position. A vertical position is advantageous in that the scraper 30 can be stored in such a position, which will allow the feed storage area 18 (see FIG. 1) to be cleaned without having to navigate around the scrapers 30. In the same fashion, this is also advantageous over other feed devices, such as moving floors, where one may need to navigate around chains and other components to clean the storage area 18. It should be understood that the range of the movement of the scraper 30 as shown in the Figures is exemplary and may be tailored for an individual's needs or preferences.

Figure 7:
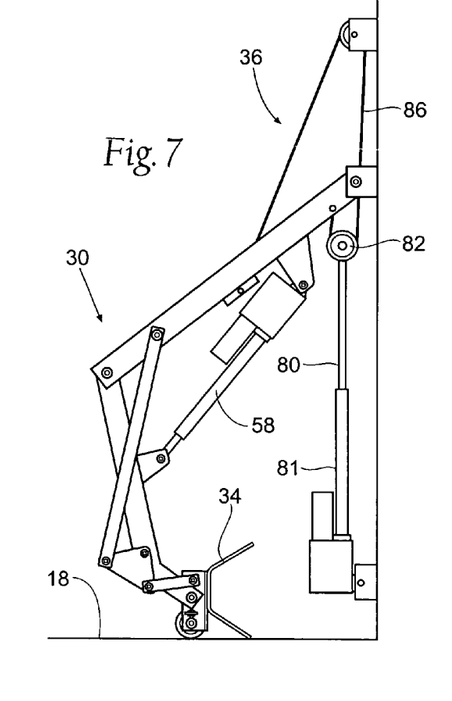
FIG. 7 is a side view of the scraper in FIG. 4 in a declined position.

As shown in FIG. 7, the scraper 30 is shown with the plow 34 moving along the floor of the storage area 18. As previously stated with respect to the upward and downward movement of the scraper 30, the scraper 30 may be programmed so that the plow 34 does not go completely down to the floor. This can also be done manually if desired or preferred. Likewise, the scraper 30 can be programmed for different relative movements with respect to the feed pile 20 (see FIG. 1). As an example, the scraper 30 can be programmed to move a specific amount of feed for a morning feeding and also be programmed to move a different amount of feed for an evening feeding. The overall system can be configured in any manner desired by the farmer.

As shown in FIGS. 5-7 upward and downward movement of the arm 32 is performed with a piston 80 and an actuator 81. In FIG. 7, the piston 80 is completely extended from the actuator. The pulley system 36 allows the arm 32 to move downward and the plow to come into contact or proximate to the floor of the feed area 18. As the piston 80 is retracted as shown in FIGS. 5 and 6, the cable 86 will be pulled downward, which moves the arm upward, out of the way of the floor and any feed pile or other objects located in the feed area 18.

Figure 8:
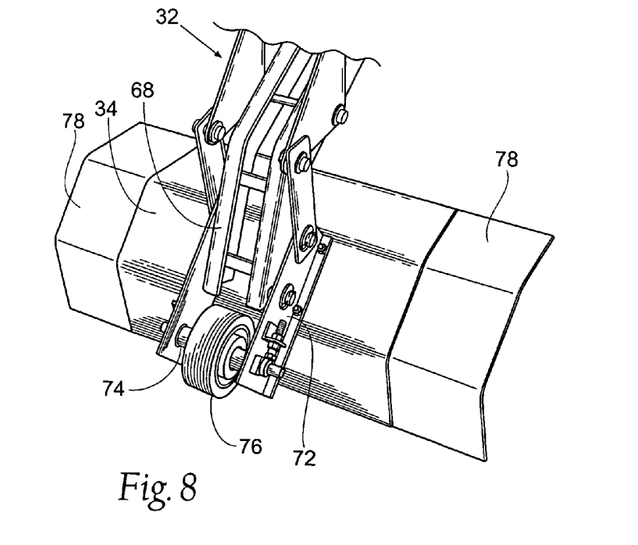
FIG. 8 is a perspective rear view of a plow in accordance with the present invention.

FIG. 8 is an up-close view of the plow 34. As previously noted, the plow 34 is attached to the arm 32 at the fifth arm section 68. The arm section 68 is preferably attached to the plow 34 with a support bracket 72, but it would be possible to directly attach the arm section to the plow 34 without an intermediary device. Any suitable attachment means, such as nuts and bolts, clamps, or screws, may be used to connect the arm 32 to the plow 34. The support bracket 68 also supports axle 74, which supports a wheel 76. The wheel 76 will ride along the floor of the storage area 18 when the scraper 30 is extended downwardly towards the floor. The wheel 76 will allow smoother movement of the scraper 30 and the plow 34 when moving the feed pile 20, and will further provide a safety so that the plow 34 will not be driven into the floor of the feed area 18, when the scraper is moved downwardly.

Still referring to FIG. 8, the plow 34 is shown as being angled inwardly towards the feed rail 18 (see FIG. 1). Such a design gathers in more feed than a flat design, which further assists in moving the feed towards the livestock and makes it easier for the plow 34 to dig into the feed pile 20. Also, the width of the plow 34 may be adjusted as necessary. In one preferred arrangement, a feed system is designed so that there would be approximately forty scrapers 30 for a 500-foot long feeding area, which is a typical length for a feeding area.

Furthermore, plow extensions 78 can be added to the plow 34 to extend or vary the length of the plow 34 to fit an individual's needs. Regardless of the number of scrapers 30 used in the feeding system, all of the scrapers 30 may be controlled from a single control box 40 (see FIG. 3), or multiple control boxes 40, if desired.

Figure 9:
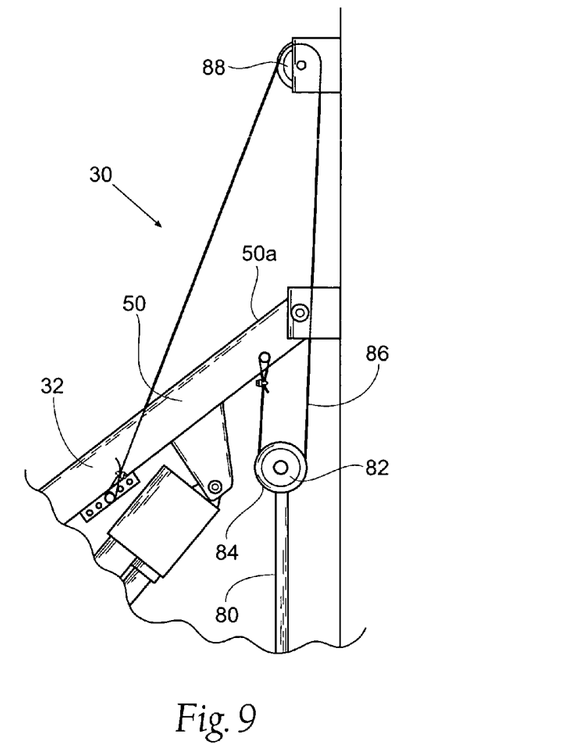
FIG. 9 is a further close-up view of a pulley system used in accordance with the present invention.

FIG. 9 is a close-up side view of the pulley system 36. As is shown in FIG. 9 and also FIG. 4, the support actuator 81 is connected to the pulley system by a first pulley 82 connected to a proximal end 84 of the piston 80 that interacts with the actuator 81. A pair of cables 86 (shown as a single cable in FIG. 9) is attached to the first arm section 50 near first end 50a. While not necessary, the use of two cables 86 provides further stability for the scraper 30. The cables 86 go around the first pulley 82 and then around a second pulley 88. The cables 86 are then reattached to the arm section 50. Thus, as previously discussed, as the piston 80 is moved upward and downward, either manually or automatically, the pulley system 36 will also cause the arm 32 to move upward and downward, as well. The actuator 81 and the actuator 58 are connected to the power supply lines 46.

Referring again to FIGS. 1 and 2, the scraper 30 is mounted on the feed rail 16 and does not have a support actuator 80 as was shown in FIGS. 4 and 9. As previously mentioned, both arrangements fall within the scope of the present invention. In FIG. 1, the pulley system 36 can be designed so that the cables 86 may wrap around a bar or shaft that rotates. It would also be possible to have individual shafts for each scraper 30 within the system, have a few scrapers 30 mounted on a shaft, or possibly have one shaft extending the entire length of the feeding rail. Alternatively; a support actuator could be mounted above the feed rail 16, which would minimize possible interference of the support actuator 80 with the feeding process. Likewise, it should be understood that other arrangements could fall within the scope of the invention. Furthermore, other means that allow the height and angle of the arm 30 to be adjusted or changed will also fall within the scope of the present invention.

The scraper 30 is preferably made of steel, iron, or other sturdy material. The arm 32 also can take on different shapes than what is shown. For instance, the arm 32 could have more or fewer individual sections and still fall within the scope of the present invention. Provided that the arm 32 is capable of moving the plow 34 so that the plow 34 can interact with the feed pile and, also, move out of contact with the feed pile and the floor of the storage area 18, the arm would fall within the scope of the present invention.

Figure 10:
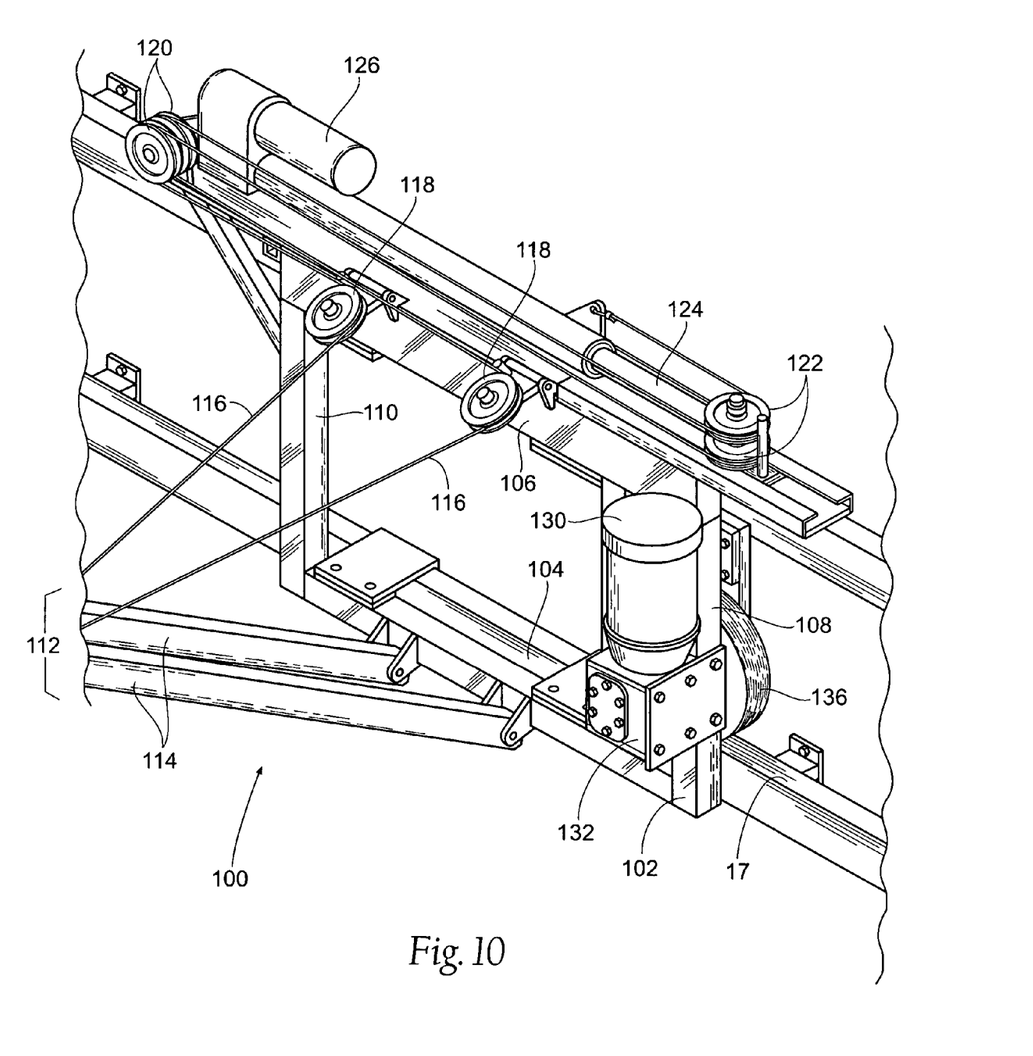
FIG. 10 is a partially cut-away perspective view of a second embodiment of a feed scraper according to the present invention.
Figure 11:
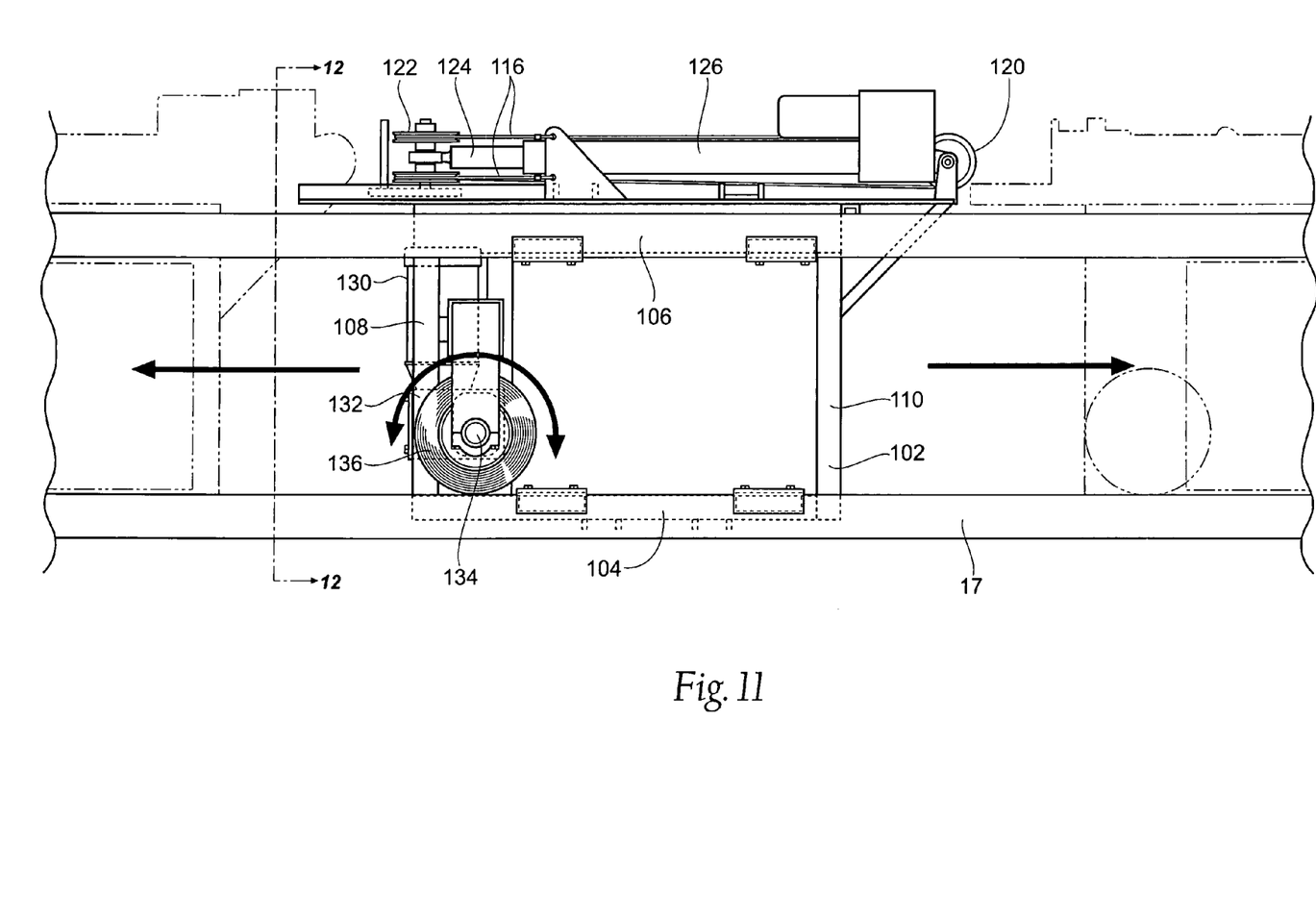
FIG. 11 is a front view of a support carriage used for the second embodiment.

FIGS. 10 and 11 provide an alternate embodiment of a scraper 100 according to the present invention. The scraper 100 is arranged for horizontal movement by way of a carriage frame 102, while still being able to access a feed pile as described for the scraper 30 previously discussed with respect to FIGS. 1-9. The frame 102 is allowed to slide along a guide rail or guide rails 17, preferably situated above the feed rail 16. The frame 102 comprises a lower horizontal support 104 and an upper horizontal support 106, a first vertical support 108 and a second vertical support 110. A motor 130 is attached to the first vertical support 108 by way of a gear reducer 132. An axle 134 (see FIG. 12) connects the gear reducer 132 to a tire 136, which rides along the guide rails 17 to provide horizontal movement for the scraper 100, which are preferably mounted above the feed rail 16 (shown in FIG. 1).

Figure 12:
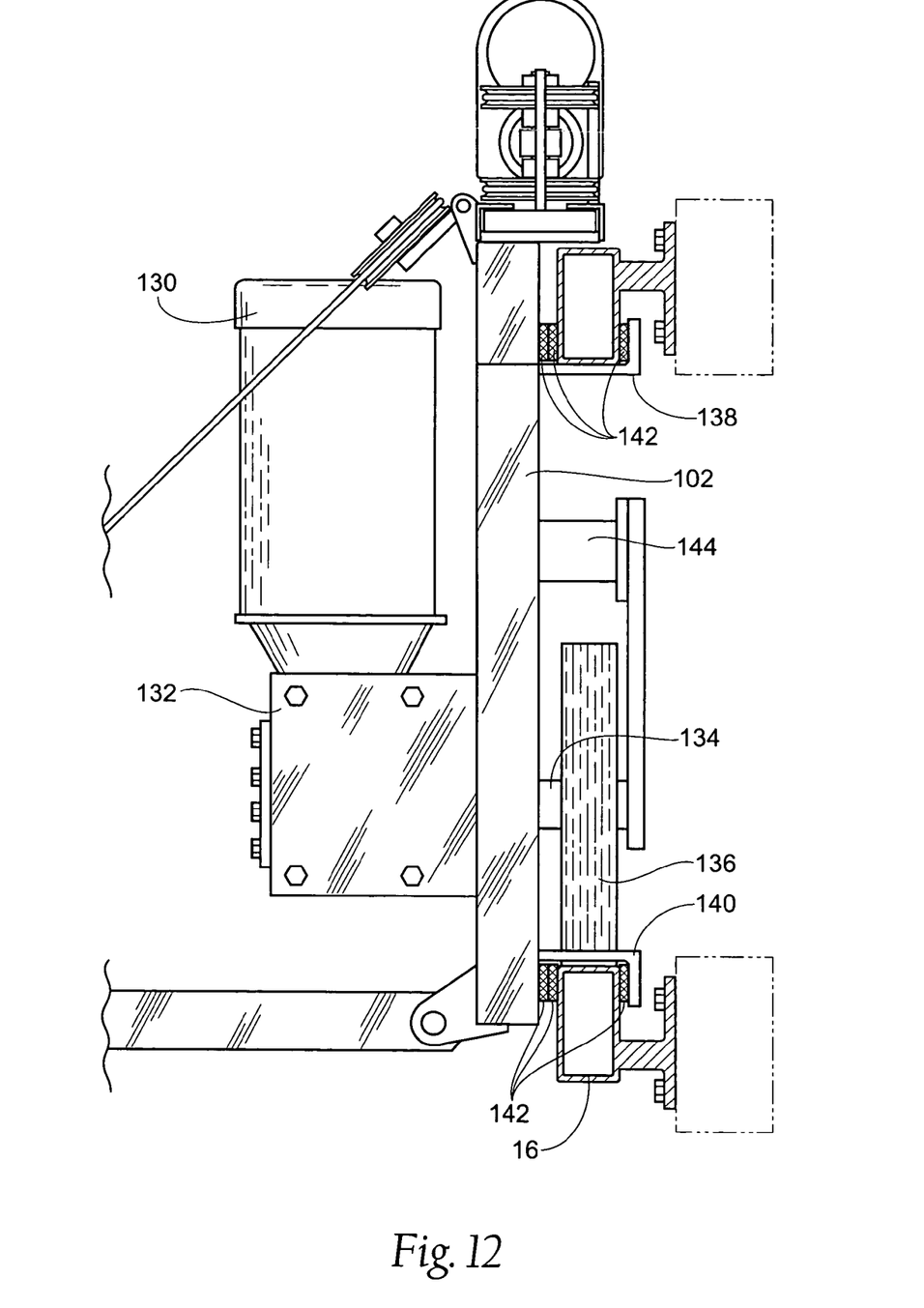
FIG. 12 is a side view of the support carriage of FIG. 11 taken along line 12-12 of FIG. 11.

Referring to FIG. 12, the frame 102 is attached to the guide rails 17 by an upper bracket 138 and a lower bracket 140. Various bushings 142 evenly space the brackets 138 and 140 from the guide rails 17 and allow for the frame to horizontally slide along the rails 17. A guide bracket 144 attached to the frame 102 further holds the tire 136 in vertical alignment with the frame 102 and the rails 17 to allow for easy gliding movement of the tire 136 along the rail 17. The arrangement shown in FIG. 12 provides an efficient system for sliding horizontal movement of the scraper 100 with respect to the feed rail 16 and the feed area, but it is understood that FIG. 12 is merely exemplary and other arrangements are possible to allow similar movement for the scraper 100.

Referring again to FIG. 10, an extendable arm 112 comprised of two arm sections 114 is pivotally mounted to the lower horizontal support 104. Unless specified, it is understood that reference to a single arm section or associated element or elements will be also a reference to the other arm section and its associated element or elements. Each of the arm sections 114 is connected to a cable 116 (see FIG. 14), with each of the cables 116 pivotally connected to the upper horizontal support 106 by a pulley 118. The cable 106 is directed towards a vertical pulley 120 and further along to a horizontal pulley 122. The horizontal pulley 122 is connected to a piston 124, which slidingly engages an actuator 126. The cable 116 is also connected to the actuator. The actuator 126 is secured to the upper horizontal support 106 and moves with the frame 102.

FIG. 11 depicts the horizontal movement of the frame 102 along the rail 17. The motor 130 provides power for the wheel 136, which can move forward or backward along the rail 17, which in turn moves the frame 102. The arrangement allows for an individual scraper 100 to service a larger portion feed area 18 than a stationary scraper. It is possible that an individual scraper 100 could be used to service an entire feed area 18. The actuator 126 is mounted on the frame 102, and is independently controlled from the movement of the frame 102, which allows the scraper 100 to be raised and out of the way of the feed pile 20 when necessary to reposition the scraper 100.

Figure 13:
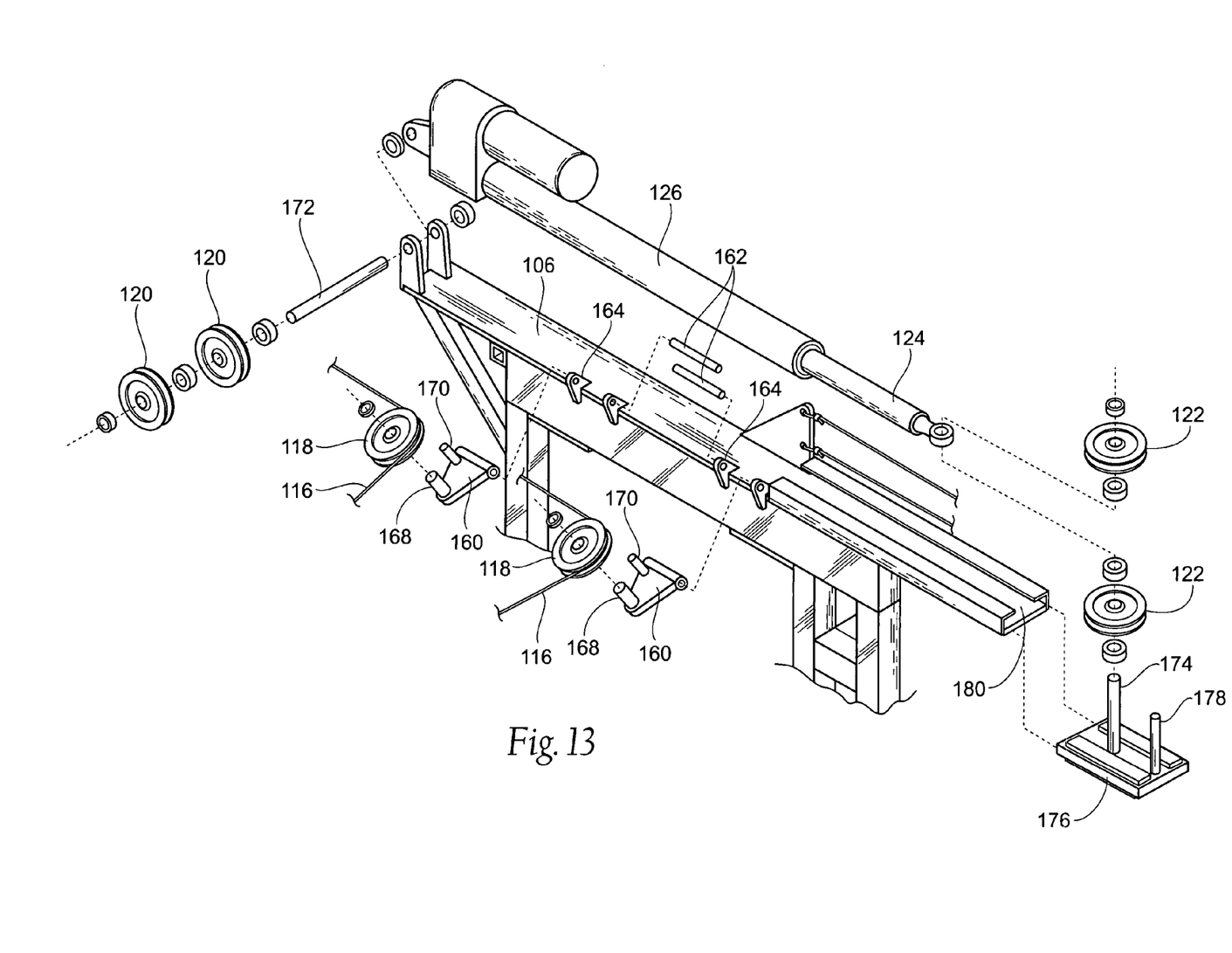
FIG. 13 is a partially cut-away exploded view of a pulley system used in accordance with the second embodiment of the present invention.
Figure 14:
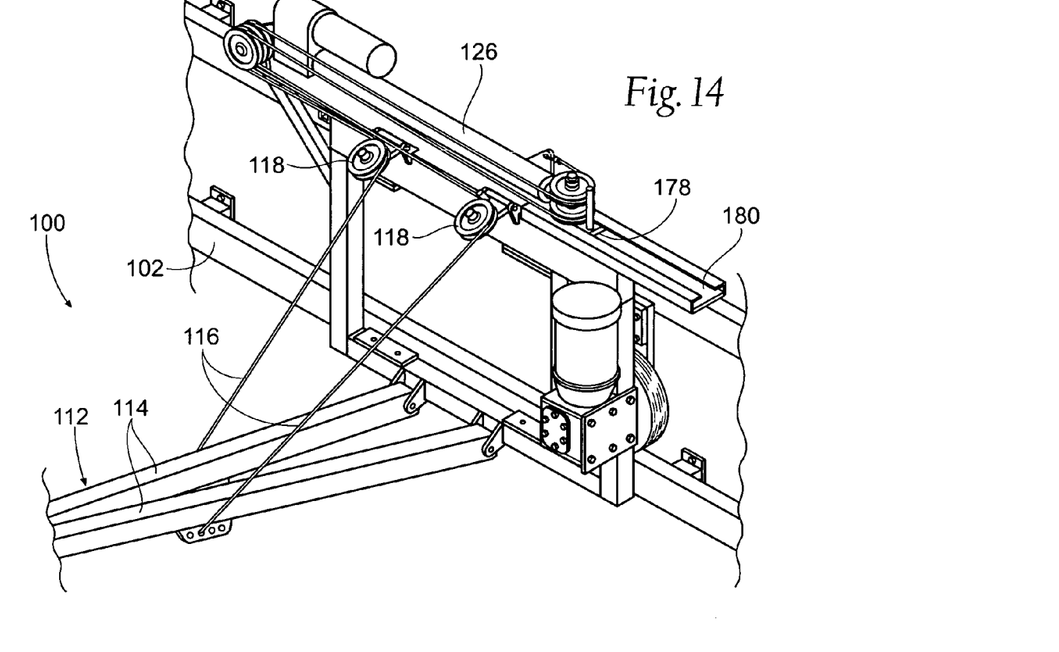
FIG. 14 is an up-close perspective view showing the pulley system according to the second embodiment having an extended arm section.
Figure 15:
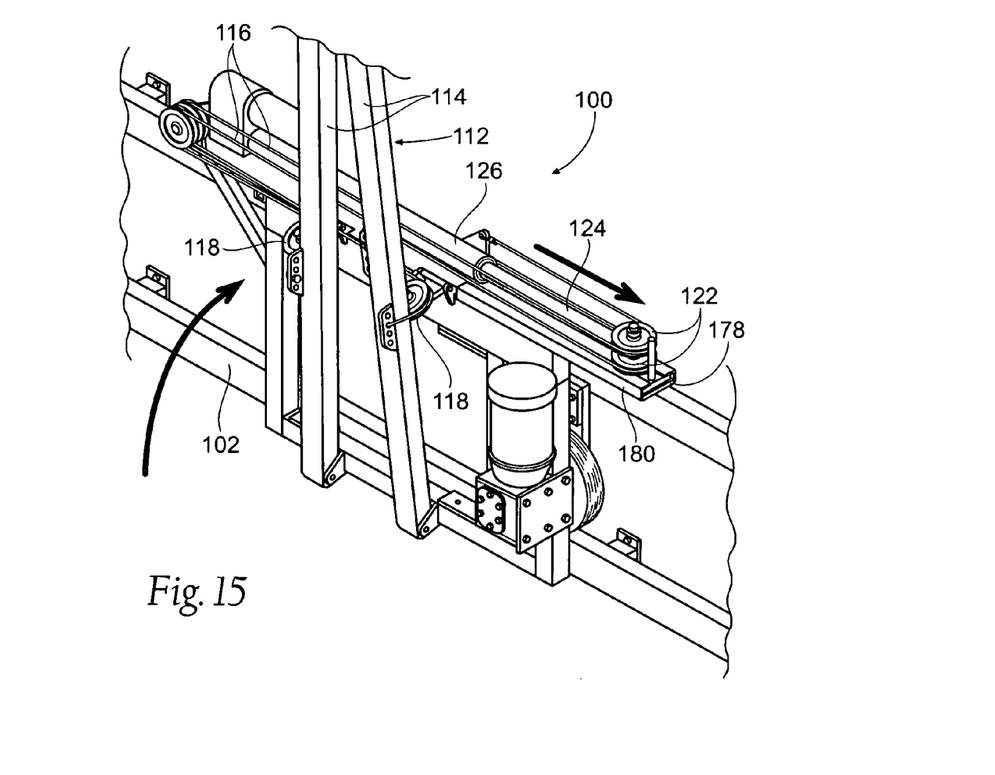
FIG. 15 shows the pulley system of FIG. 14 with the arm section being in a retracted position.

FIG. 13 shows an exploded view of the pulley system used to raise and lower the arm 112 (see FIGS. 14 and 15). Each of the pulleys 118 is attached to the upper horizontal support 106 by a guide plate 160. A guide pin 162 inserted into a guide bracket 164 allows the guide plate 160 to be pivotally connected to the upper horizontal support 106. Further, a guide axle 168 allows the pulley 118 to be rotatably connected to the guide plate 160. A guide pin 170 prevents the cable 116 from slipping off of the pulley 118 on its way to the vertical pulley 120.

The vertical pulleys 120 and the actuator 126 are preferably mounted on the upper horizontal support 106 using a single axle 172, but may be mounted separately, if desired. As previously stated, the actuator 126 is slidably engaged by the piston 124. The piston 124 and the horizontal pulleys 122 are joined together with an axle pin 174 located on a glide late 176. The glide plate 176 further comprises a horizontal guide pin 178 that prevents the cables 116 from slipping off of the pulleys 122 when traveling from the pulleys 120 to the actuator 126. The glide plate 176 slides into a channel 180 that is attached to the upper horizontal support 106. The channel 180 and the support 106 may be integrally formed, or the channel 180 may be attached as a separate element. As the piston 124 extends and retracts, the guide plate 176 will slide within the channel 180.

FIGS. 14 and 15 demonstrate the movement of the actuator 126 and the arm 102. In FIG. 14, the arm 102 is an extended position, similar to the arrangement that is shown for the scraper 30 in FIG. 2. The piston 124 is retracted within the actuator 126. As the piston 124 is extended outwardly to the position shown in FIG. 15, the glide plate 178 is moved outwardly, as well, allowing the pulleys 122 to turn. The cables 116 are moved along the pulleys 118, which forces the arm sections 114 to be pulled upward and clear of the feed area (see FIG. 1). The movement of the scraper 100 is directed by horizontal movement of the actuator 126, as opposed to vertical movement described previously with respect to the scraper 30. As demonstrated, a wide range of movements and arrangements will fall within the scope of the present invention.

Movement of the arm 112 and the plow (not shown) can be accomplished as previously discussed with respect to the scraper 30. That is, the actuator 54 could be used for inward and outward movement to move the feed pile 20 towards the livestock 12 or other animals (see FIG. 2). It is understood that various features of either discussed embodiment could be incorporated into the other embodiment.

Figure 16:
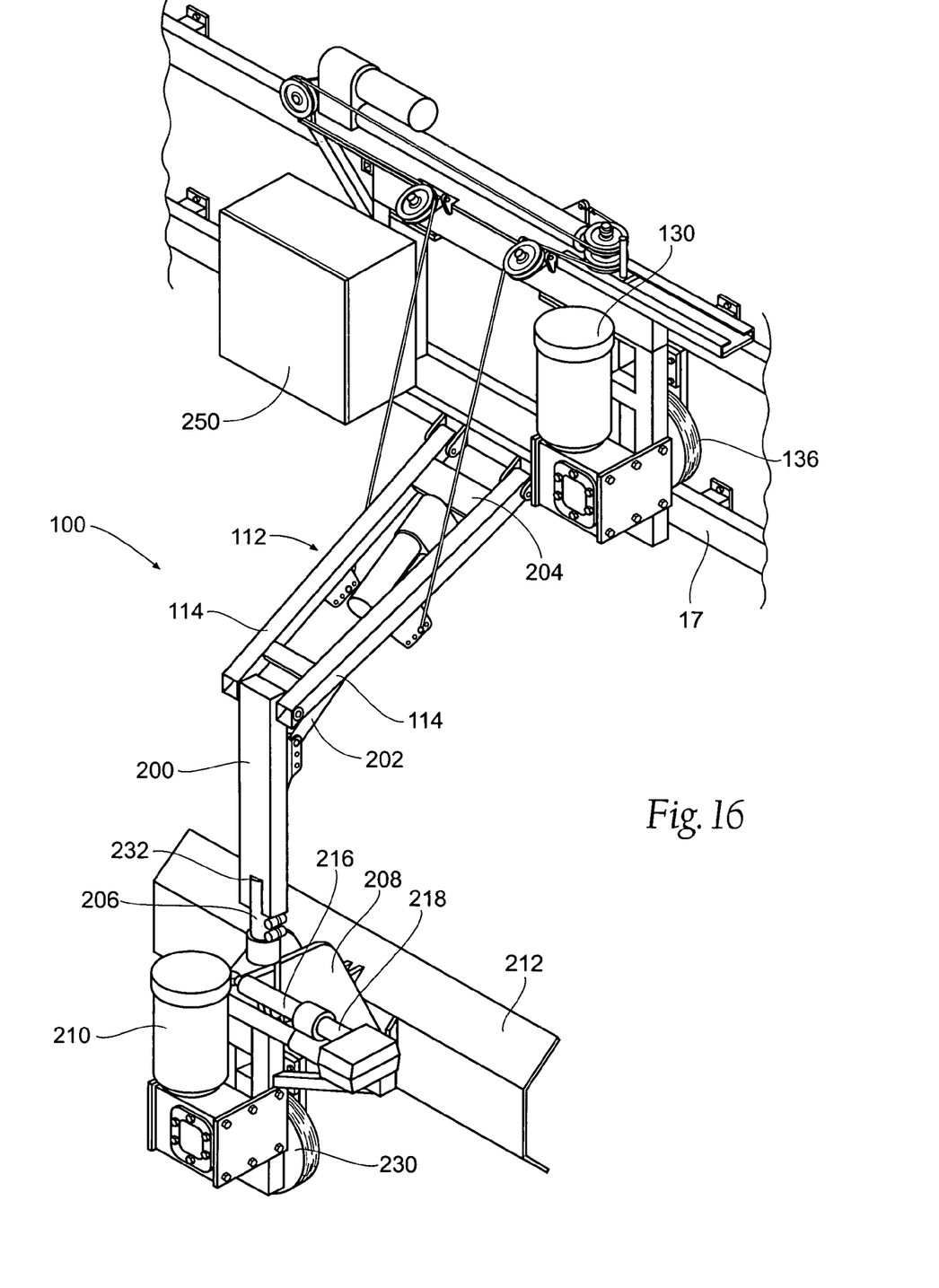
FIG. 16 is a perspective view of the second embodiment of the invention.

FIG. 16 provides a perspective view of the scraper 100. The arm sections 114 of the extendable arm 112 are further pivotally connected to an upper arm section 200. An actuator 202 is mounted to a cross brace 204 located between the arm sections 114 at one end and to the upper arm section 200 at the opposing end. The actuator 202 allows controlled pivotal movement of the upper arm section 200 with respect to the arm sections 114. The upper arm section 200 is rotatably connected to a coupling 206, which in turn is connected to a bracket 208. The bracket 208 supports a second motor 210, a plow 212, and an actuator 214. As will be discussed further, the actuator 214 provides rotational movement for the plow 212 with respect to the upper arm section 200. FIG. 16 shows that an extendable arm used in the present invention can be designed in different mechanical arrangements and still fall within the scope of the present invention.

Figure 17:
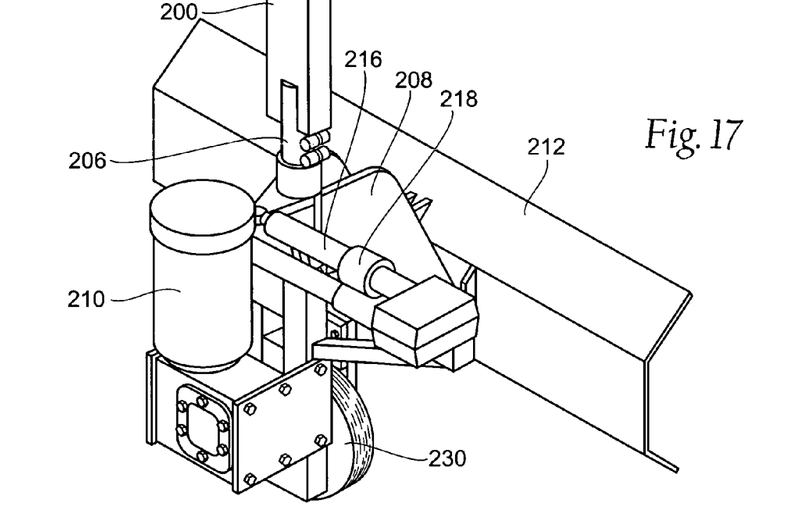
FIG. 17 provides a close-up perspective view of the plow section of the second embodiment.

FIG. 17 shows a perspective view of the plow 212 and the second motor 210. As previously stated, the actuator 214 allows for the plow 212 to rotate with respect to the upper arm section 200 and the arm 112, in general. The actuator 214 allows for a further degree of freedom for the scraper 100 over prior art designs. A piston 216 slidingly engages a cylinder 218 connected to the actuator 214. When the plow 212 is in a starting position, parallel to the guide rails 17 (see FIG. 16), half of the piston 216 is within the cylinder 218 and half is outside of the cylinder 218. This allows the plow 212 to rotate to the right and to the left. When the piston 216 retracts further into the cylinder 218, the plow 212 will rotate to the right (see FIG. 18). When the piston is extended further out of the cylinder 218, the plow 212 will rotate to the left (see FIG. 17).

Still referring to FIGS. 16 and 17, a wheel 230 is also mounted on the bracket 208. Preferably, the wheel 230 is aligned with the wheel 136, and the wheels 136, 230 will move synchronously with one another. For example, a control box 250 may be programmed so that the motors 130, 210 are able to move and work in tandem. Such movement will reduce stress that may result on the scraper 100 if the individual components and elements moved separately. Also, to alleviate stress on the wheel 230 when the scraper 100 is moved downward towards the feed area 18 (see FIGS. 1 and 2), a shock absorber or strut 232 may be included.

Figures 18, 19:
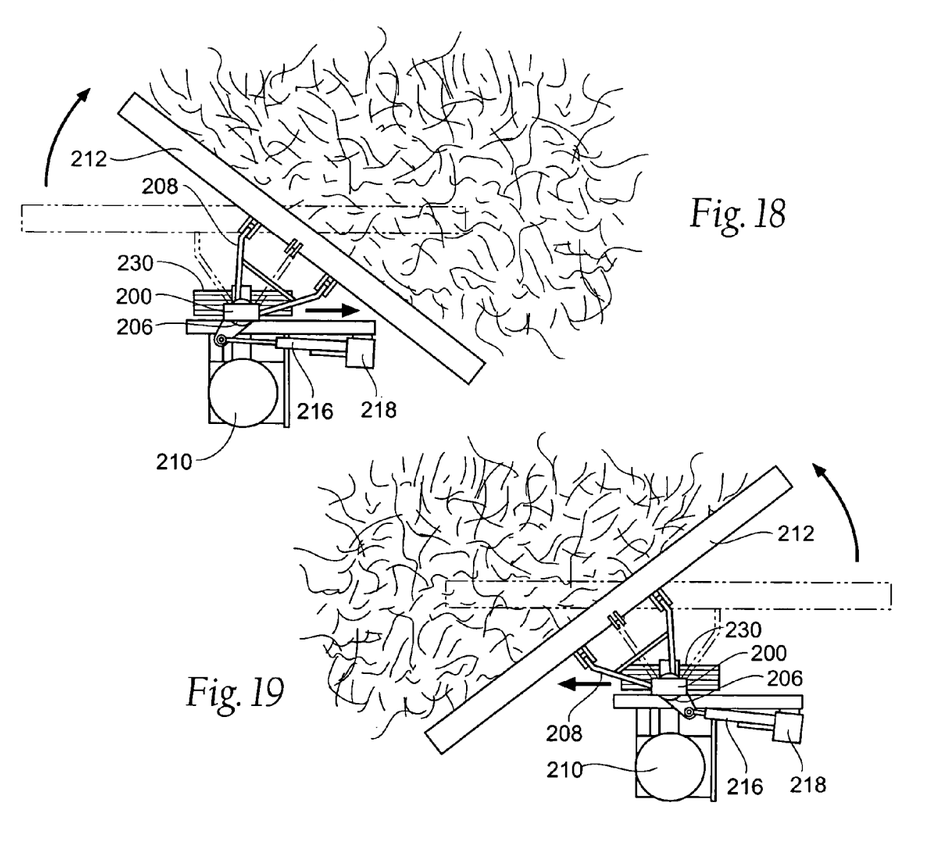
FIGS. 18 and 19 are overhead views of the plow of the second embodiment in various positions.

As previously mentioned, FIGS. 18 and 19 show the plow 212 rotated to the left and to the right. The ability for the plow 212 to rotate increases the range and area that the plow 212 can be used for reaching the feed pile. The plow 212 can be turned inwardly so that the ends or edges of the feed pile will still be directed towards animals. The wheel 230 is shown as not turning when the plow 212. However, it is possible that the wheel 230 could turn with the plow 212, if desired.

The present invention is beneficial in that it reduces the necessary time and effort needed by a person or persons to make sure that the livestock have a sufficient amount of feed. Since the system can be set automatically to move a feed pile at predetermined times, less time is needed to monitor the livestock's consumption. Likewise, the system simplifies the cleaning process of a feed area. The scrapers 30 in the system can be stored above and away from the floor of the feed storage area 18, which is advantageous when cleaning the storage area 18. Because the floor is clear of obstructions, which can happen with devices that move along the floor, it is much quicker and easier to sweep out the storage area 18, when necessary.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention.

I claim:

1. A device for placing food located on a floor within reach of one or more animals, said animals being separated from the food by a feeding rail, said device comprising:
    a stationary mounting structure located relative to said feeding rail;
    an extendable arm having a proximal end and a distal end, said extendable arm mounted on said mounting structure at said proximal end;
    at least one plow attached to said extendable arm at said distal end, said plow arranged to move said food toward said mounting structure and said feeding rail and within reach of said animals;
    said extendable arm being movable to and storable in a position elevated from said floor;
    a power source; and
    means for extending said arm, said extending means being in communication with said power source.

2. The device according to claim 1 further comprising means for moving said plow along said floor.

3. The device according to claim 2, wherein said means for moving said plow comprises a wheel structure.

4. The device according to claim 1 wherein said length of said extendable arm is adjustable.

5. The device according to claim 1 further comprising means for programming said movement of said extendable arm.

6. A device for placing food on a floor within reach of one or more animals, said device comprising:
    a mounting structure;
    an extendable arm having a proximal end and a distal end, said extendable arm mounted on said mounting structure at said proximal end;
    at least one plow attached to said extendable arm at said distal end, said plow arranged to move said food within reach of said animals;
    said extendable arm being movable to and storable in a position elevated from said floor;
    a power source; and
    means for extending said arm, said extending means being in communication with said power source, wherein said extending means further comprises a pulley system.

7. The device according to claim 6 wherein said extending means further comprises an actuator connected to said pulley system.

* * * * *